United States Patent
Souissi

(10) Patent No.: US 9,282,460 B2
(45) Date of Patent: Mar. 8, 2016

(54) SYSTEMS AND METHODS FOR CONTROLLING DEVICE NETWORK ACCESS THROUGH A WIRELESS ROUTER

(71) Applicant: Novatel Wireless, Inc., San Diego, CA (US)

(72) Inventor: Slim Salah Souissi, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 0 days.

(21) Appl. No.: 14/530,521

(22) Filed: Oct. 31, 2014

(65) Prior Publication Data

US 2015/0050918 A1    Feb. 19, 2015

Related U.S. Application Data

(63) Continuation of application No. 12/618,677, filed on Nov. 13, 2009, now abandoned, which is a continuation of application No. 12/537,970, filed on Aug. 7, 2009, now Pat. No. 9,055,606.

(60) Provisional application No. 61/178,926, filed on May 15, 2009.

(51) Int. Cl.
| | |
|---|---|
| H04W 12/08 | (2009.01) |
| H04L 29/06 | (2006.01) |
| H04W 12/06 | (2009.01) |
| H04W 48/02 | (2009.01) |
| H04W 88/08 | (2009.01) |
| H04W 40/22 | (2009.01) |
| H04W 40/24 | (2009.01) |
| H04W 76/02 | (2009.01) |

(52) U.S. Cl.
CPC ........... *H04W 12/08* (2013.01); *H04L 63/0236* (2013.01); *H04L 63/0876* (2013.01); *H04W 12/06* (2013.01); *H04W 48/02* (2013.01); *H04W 40/22* (2013.01); *H04W 40/24* (2013.01); *H04W 76/02* (2013.01); *H04W 88/08* (2013.01)

(58) Field of Classification Search
None
See application file for complete search history.

(56) References Cited

U.S. PATENT DOCUMENTS

| 7,778,230 B2 * | 8/2010 | Fulknier et al. ............... 370/338 |
| 7,974,622 B1 * | 7/2011 | McKinney et al. ........... 455/433 |
| 2004/0219905 A1 * | 11/2004 | Blumenthal et al. .......... 455/411 |
| 2005/0181792 A1 * | 8/2005 | Kobayashi et al. ........ 455/435.2 |
| 2005/0286476 A1 * | 12/2005 | Crosswy et al. ............... 370/338 |
| 2006/0153122 A1 * | 7/2006 | Hinman et al. ................ 370/328 |
| 2007/0115950 A1 * | 5/2007 | Karaoguz et al. ............. 370/356 |
| 2009/0132682 A1 * | 5/2009 | Counterman ................. 709/220 |
| 2009/0288140 A1 * | 11/2009 | Huber et al. ...................... 726/2 |

\* cited by examiner

*Primary Examiner* — Redentor Pasia
(74) *Attorney, Agent, or Firm* — TechLaw LLP

(57) ABSTRACT

Systems and methods are provided for enabling communications over a wide area network and a local area network, wherein one or more computing devices may communicate with a wireless router over the local area network, and wherein the one or more computing devices may obtain access to the wide area network if authorized. Authorization of the one or more computing devices can be dependent upon discovery of the one or more computing devices, as well as a device type of the one or more computing devices. Authorization may also involve discovering a service being run or requested by the one or more computing devices, and determining whether the type of service being run or requested by the one or more computing devices is authorized by the wide area network.

19 Claims, 7 Drawing Sheets

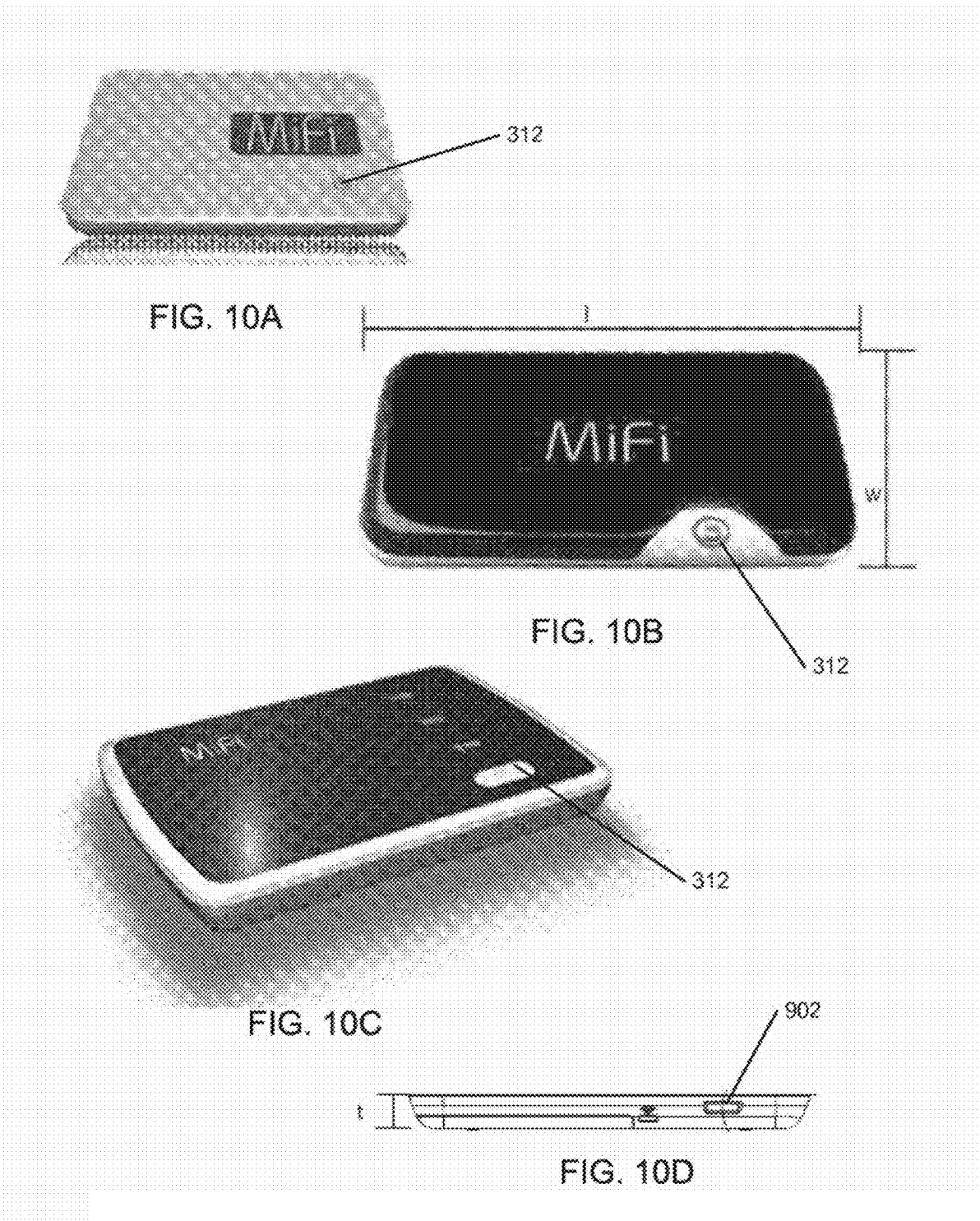

SYSTEMS AND METHODS FOR CONTROLLING DEVICE NETWORK ACCESS THROUGH A WIRELESS ROUTER

CROSS-REFERENCE TO RELATED APPLICATIONS

The present application claims the benefit under 35 U.S. C. §119(e) of U.S. Provisional Application Ser. No. 61/178,926, filed May 15, 2009 and entitled "Rule Based Internet Browser Redirect for Wireless WAN Routers," and which is incorporated herein by reference in its entirety as if set forth in full. The present application also claims priority as a continuation under 35 U.S.C. §120 to U.S. patent application Ser. No. 12/618,677 filed Nov. 13, 2009, which in turn is a continuation in part under 35 U.S.C. §120 to U.S. patent application Ser. No. 12/537,970, filed Aug. 7, 2009 and entitled "Systems and Methods for Automatic Connection with a Wireless Network," both of which are also incorporated herein by reference in their respective entireties as if set forth in full.

TECHNICAL FIELD

The embodiments described herein generally relate to wireless communication and more particularly to the ability to limit what devices can access a wireless Wide Area Network (WAN) through a mobile, wireless router.

BACKGROUND

Wireless modems exist that can be inserted, or otherwise interfaced with a computer and that enable data communication over a wireless Wide Area Network (WAN) such as a cellular type network. Early versions of these cards had connectors that complied with the PCMCIA standard and that were inserted into a slot in the side of the computer. Newer versions have USB connectors for interfacing with the computer. Such modems allow access to the Internet, or World Wide Web (WWW), even where no wired network connection exists and are most often interfaced with a laptop or other portable computing device.

FIG. 1 illustrates a conventional system 100 in which a data connection can be established over a wide area network using a conventional wireless modem 104. In FIG. 1, modem 104 is interfaced, e.g., via a PCMCIA slot or USB connection, with a computing device 106 via connection 110. Modem 104 can then establish a data connection between base station 102, associated with, e.g., a cellular type network, and computer 106. Modem 104 and base station 102 can communicate via wireless signals 108.

FIG. 2 is a flow chart illustrating a conventional process by which such a data connection can be established. First, in step 202, a user of computing device 106 inserts, or connects modem 104 with computer 106. In step 204, modem 104 is then tethered to computing device 106. Once modem 104 is tethered to computing device 106, a connection manager running on computing device 106 can be launched in step 206. The connection manager will often display whether the network, i.e., the WAN, is available. If it is, then in step 208 the user can select the network, which will cause a Point-to-Point Protocol (PPP) connection to be established between base station 102 and computer 106 via modem 104 in step 210.

In networking, the PPP is a data link protocol commonly used to establish a direct connection between two networking nodes. It can provide connection authentication, transmission encryption privacy, and compression. PPP is used over many types of physical networks including serial cable, phone line, trunk line, cellular telephone, specialized radio links, and fiber optic links such as SONET. For example, most Internet service providers (ISPs) use PPP for customer dial-up access to the Internet. PPP is commonly used as a data link layer protocol for connection over synchronous and asynchronous circuits, where it has largely superseded the older, non-standard Serial Line Internet Protocol (SLIP) and Telephone Company mandated standards, such as Link Access Protocol, Balanced (LAPB) in the X.25 protocol suite. PPP is designed to work with numerous network layer protocols, including Internet Protocol (IP), Novell's Internetwork Packet Exchange (IPX), NBF, and AppleTalk.

One drawback to system 100 of FIG. 1 is that only a single computing device 106 can be interfaced with base station 102 via modem 104. This is because modem 104 is tethered to computing device 106. In the related '970 application, incorporated above, a wireless router was disclosed that allowed multiple devices to access a wireless broadband network, e.g., via the wireless WAN, at the same time. Such a wireless router represents the next evolution of broadband connectivity. Such a device enables any consumer electronics device that, e.g., has a USB connector or an 802.11 transceiver to attach to the wireless broadband network. This does, however, potentially create problems for the wireless carriers.

Such a wireless router solution may create unwelcome traffic on the carriers' networks. Carriers prefer to manage the capability of such a wireless router device in terms of: a. what consumer electronics devices are allowed to attach to the broadband network and b. what services are allowed to run on the device. Conventional 3G router devices provide unlimited open access to any Wifi capable device. They do not have built in intelligence to discriminate between one peripheral 802.11 device or service and another to effectively filter those devices/services according to, e.g., programmed rules. Some routers do limit access to the network to a certain number of connections, but this is really not sufficient to address the carriers' concern with respect to the wireless router device disclosed in the '970 Application.

SUMMARY

Various embodiments of the present disclosure are set out in the claims.

According to a first embodiment, a method comprises: establishing a first data connection with a base station associated a wide area network over the wide area network; establishing a second data connection with at least one computing device over a local area network; discovering the at least one computing device and a device type of the at least one computing device; and determining, based on the device type of the at least one computing device, whether the at least one computing device is authorized to access the wide area network.

According to a second embodiment, a method comprises: establishing a first data connection with a base station associated a wide area network over the wide area network; establishing a second data connection with at least one computing device over a local area network; discovering a service being requested by or being run by the at least one computing device and a service type of the service; and determining, based on the service type, whether the service is authorized by a carrier operating the wide area network.

BRIEF DESCRIPTION OF THE DRAWINGS

Features, aspects, and embodiments are described in conjunction with the attached drawings, in which:

FIGS. 10A-D are diagrams illustrating various example implementations of a wireless router.

DETAILED DESCRIPTION OF THE DRAWINGS

In the embodiments below, a wireless router is used to interface a plurality of computing device or LAN client devices with a wireless WAN. For example, the WAN can be configured to implement one of the Third Generation (3G) protocols, such as EDGE, CDMA2000, or the Universal Mobile Telecommunications System (UMTS) protocols, High Speed Packet Access (HSPA) or HSPA+protocols, Long Term Evolution (LTE) protocols, Evolution Data Optimization (EV-DO) rev. A (DOrA), WiMAX, or other newer 4G protocols. The computing devices interface with the wireless router over a wireless Local Area Network (LAN) such as a WiFi network, wireless USB network, ultrawideband network, or a Zigbee network; however, it will be understood that the descriptions that follow are not intended to limit the embodiments herein to particular standards or architectures, the embodiments being provide by way of example only.

Figure 1:
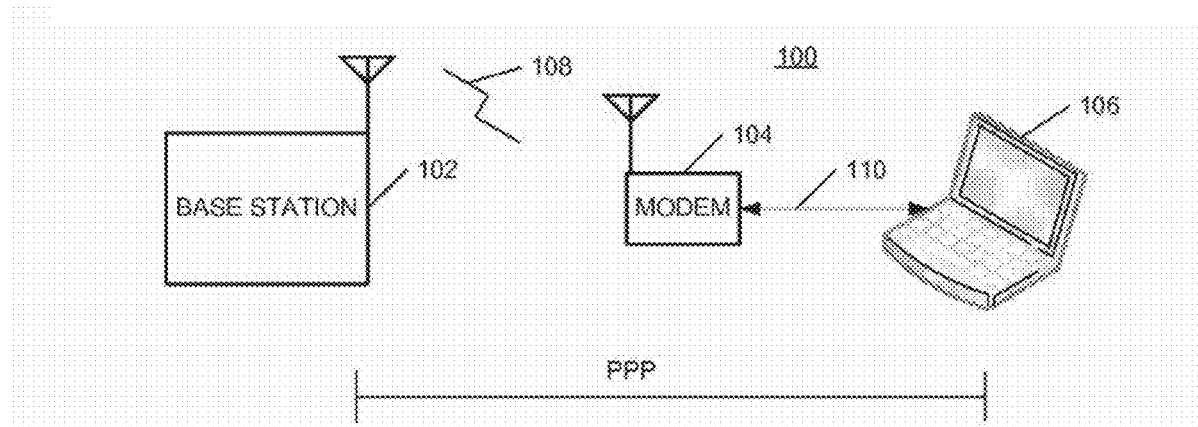
FIG. 1 is a diagram illustrating a conventional system for using a wireless modem to access a WAN.
Figure 2:
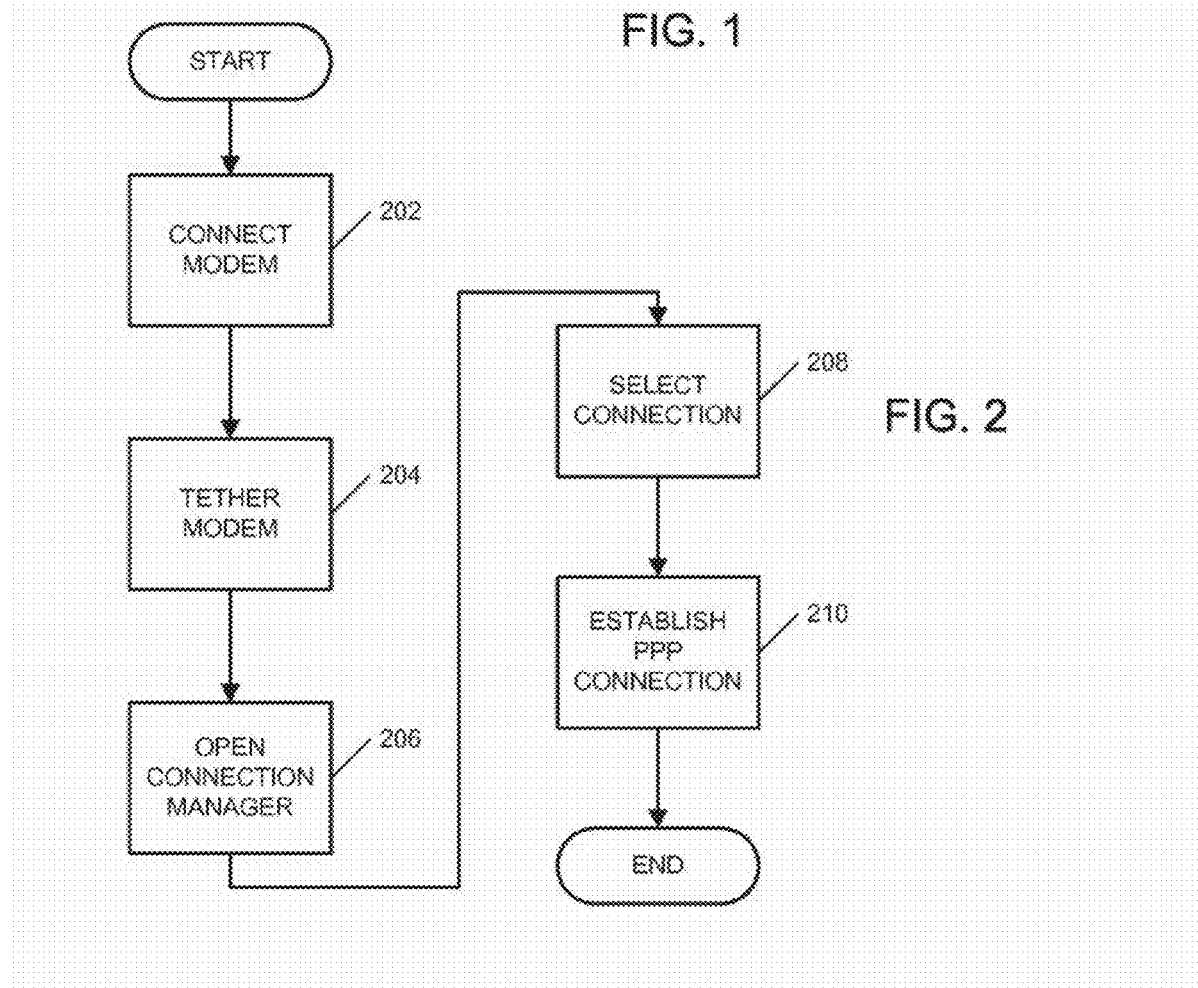
FIG. 2 is a flow chart illustrating a conventional process for establishing a data connection using a modem included in the system of FIG. 1.
Figure 3:
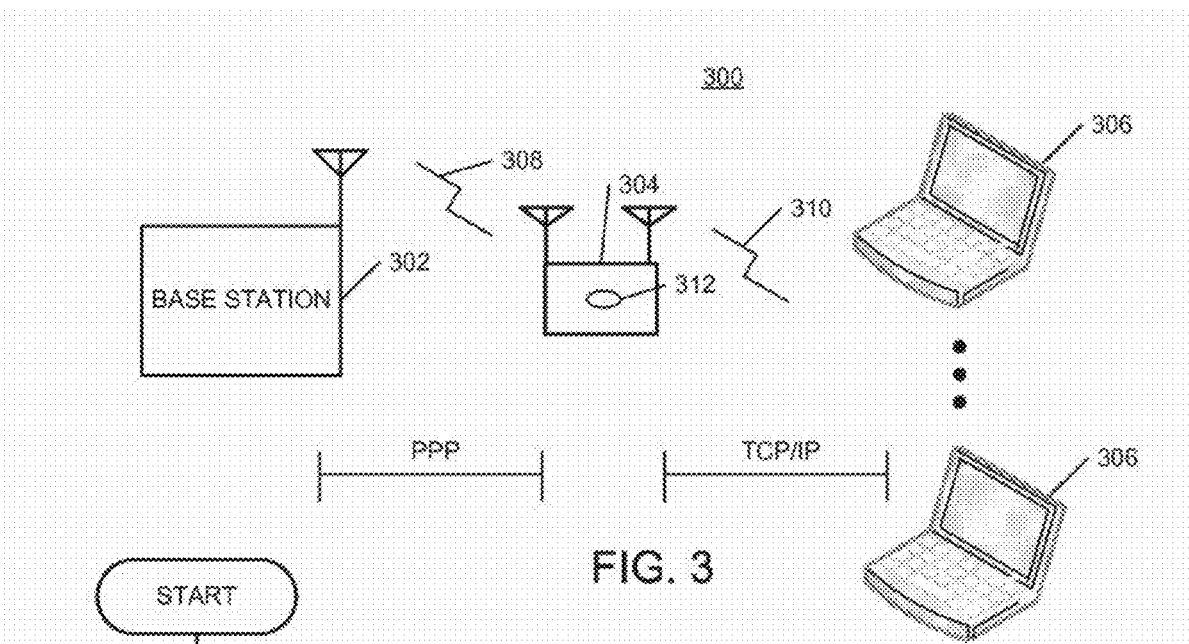
FIG. 3 is a diagram illustrating an example system for using a wireless router to access a WAN in accordance with one embodiment.

FIG. 3 is a diagram illustrating an example system 300 for using a wireless router to access a WAN in accordance with one embodiment. Central to system 300 is wireless router 304. While not illustrated in detail in FIG. 3, wireless router 304 can comprise two radio communication interfaces: one for communicating with a base station 302 associated with a WAN, and one for communicating with a plurality of computing or wireless LAN client devices 306 via a wireless LAN. Thus, wireless router 304 can communicate with base station 302 via wireless signals 208 and with devices 306 via wireless signals 310, where signals 308 and 310 implement different protocols associated with the related network.

Figure 4:
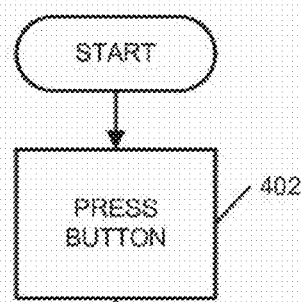
FIG. 4 is a flow chart illustrating an example process for establishing a data connection using a wireless router included in the system of FIG. 3 in accordance with one embodiment.

In certain embodiments, wireless router 304 can, e.g., be configured to interface as many as five (5) computing devices 306 with base station 302. FIG. 4 is a flow chart illustrating an example process by which devices 306 can be interfaced with base station 302. As can be seen in FIG. 3, wireless router 304 can comprise a single power button, or switch 312, when a user presses button 312 to power on wireless router 304, in step 402, then wireless router 304 will power up and automatically establish a data connection, e.g., a PPP connection, with base station 302 in step 404. As illustrated, this PPP connection is between base station 302 and wireless router 304 and not between base station 302 and devices 306. In step 406, wireless router 304 will then enable the LAN. In step 408, devices 306 can automatically connect to the WAN through wireless router 304 and the LAN connections 310. In other words, wireless router 304 can act as a wireless LAN access point for devices 306. Communication between wireless router 304 and devices 306 can be via TCP/IP over WiFi. In certain embodiments, the users of devices 306 must provide a password when accessing the LAN. The password can be printed on device 304 or displayed on device 304.

Thus, all that is required to enable multiple computing devices 306 to access the wireless WAN is to power on wireless router 304, and possibly provide a password. Wireless router 304 will automatically establish a connection with the WAN and enable the wireless LAN hotspot in response. There is no tethering of wireless router 304 with devices 306.

The embodiments described herein address the issue of unrestricted open access of wireless router's by allowing only authorized devices and users to connect through the wireless router. As noted above, Carriers have concerns about having an unlimited number of 802.11, or other devices potentially connecting to their broadband network. They also have concerns about service that would run openly on the carrier networks causing capacity degradations without the carriers being able to benefit from the use of these services.

Accordingly, as described in more detail below, an algorithm for discovering the type of device that is requesting a connection to the broadband network can be embedded within the wireless router processor circuitry. The same algorithm, or alternatively a different algorithm, can also be capable of discovering the type of application or service that is supposed to run on the wireless router device. Once device and service is discovered, a decision can be made, e.g., based on preset preferences stored in the device, with respect to what device is allowed to attach to the broadband network and what service or application is allowed to run on the wireless router device. Only authorized devices and services are allowed to use the wireless router. Thus, a carrier can provision at the factory or remotely a wireless router device and configure it to filter certain devices or certain services from operating on the broadband network.

Figure 5:
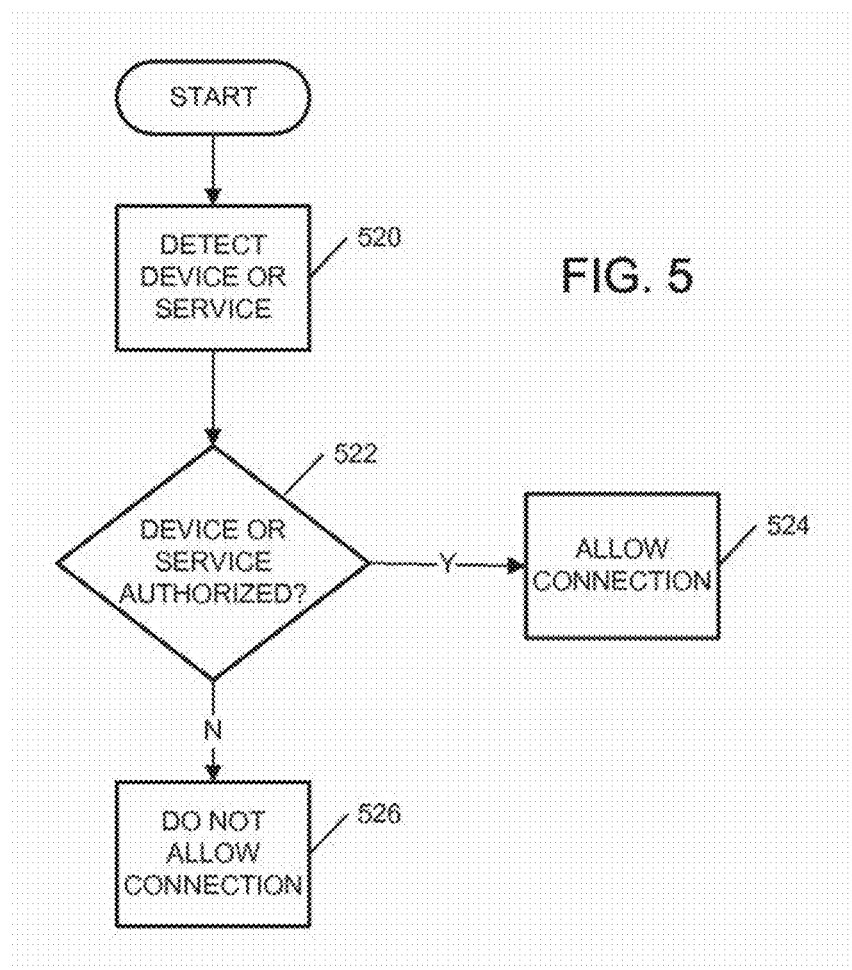
FIG. 5 is a flow chart illustrating an example method for filtering devices and services attempting to access the wireless broadband network via the wireless router of FIG. 3 in accordance with one embodiment.

The basic filtering steps are illustrated in FIG. 5. First, in step 520, a wireless router 304 can detect what device is trying to access the broadband wireless network through wireless router 304. In addition, or alternatively, wireless router 304 can detect what type of service the device is requesting or trying to access in step 520. In step 522, wireless router 304 can determine whether the device, the service, or both are authorized by the associated carrier. Again, rules for determining whether a device or service is authorized can be loaded at the factory, or provisioned, updated, or both remotely, i.e., via the wireless WAN. If the device, service, or both, are authorized, then in step 524, the connection can be allowed by wireless router 304. Otherwise, the connection can be denied in step 526.

For device filtering, the device discovery of step 520 can be based on its MAC address. Other means for discovering the device could be through the browser ID or by means of an application that runs on the peripheral device and that presents identification credentials to wireless router 304. Based on the type of device discovered in step 520, wireless router 304 decides whether to allow the device to connect on the network or not in step 522. For example, the decision could be based on the basis of a decision table stored in wireless router 304 that lists authorized devices, banned devices, or both. The table could reside on the PHS memory, or alternatively remotely on a server depending on the implementation.

For service filtering, the service discovery step of 520 can use the same basic algorithm as device filtering. The service could be discovered by various methods. For example, packet sniffing technology allows for identifying the type of service being run for instance Video vs. VOIP etc. Thus, some form of packet sniffing can be used to determine the service in step 520. Service detection can also be accomplished by monitoring the IP address to which the device connects. For instance, if wireless router 304 is looking to ban E-reader type services, then it could track the content server IP address being requested and ban connectivity to that server. In most embodiments, the algorithm for the service filtering resides on wireless router 304, but again it can be updated from a server.

In alternative embodiments, all or a portion of the traffic generated by devices 306 can be routed to a designated proxy server. The proxy server (not shown) can then be configured to perform the filtering. Such an approach can be advantageous in that it can make available additional computing power.

In certain embodiments, the Quality of Service (QoS) made available to a certain device 306 can be based on the device and service filtering described above. For example, device based QoS can be based on the above device filtering and service filtering algorithms to determine what level of service to provide to the device or service that is detected. The types of service provided can be the following:

a. Time delay of transmission
  i. Immediate
  ii. Cached and delayed
b. Bandwidth allocation
c. Priority of packets Thus, a device 306 can be provisioned so as to ban a certain service, for instance say e-reader services. Wireless router 304 can discover the service either though the reading of the device Mac address, sniffing IP packets or reading the content server IP address. Once a banned service request is discovered, connectivity to the content server can be banned and a message sent to the user to inform him/her about the unauthorized use of the service. Another example use can be to pair a device with a WiFi camera and only allow the pictures to be uploaded to certain sites at particular times.

In certain embodiments, the WAN controller/interface portion of wireless router 304 (see FIG. 6) can be put to sleep, while the LAN controller/interface is awake and monitoring traffic from devices 306. This can, for example, conserve battery power. Thus, if there were long periods of inactivity where devices 306 are connected but not accessing from or sending information to the WAN, then the WAN portion of wireless router can be deactivated, or put in a sleep mode to conserve power.

Figure 6:
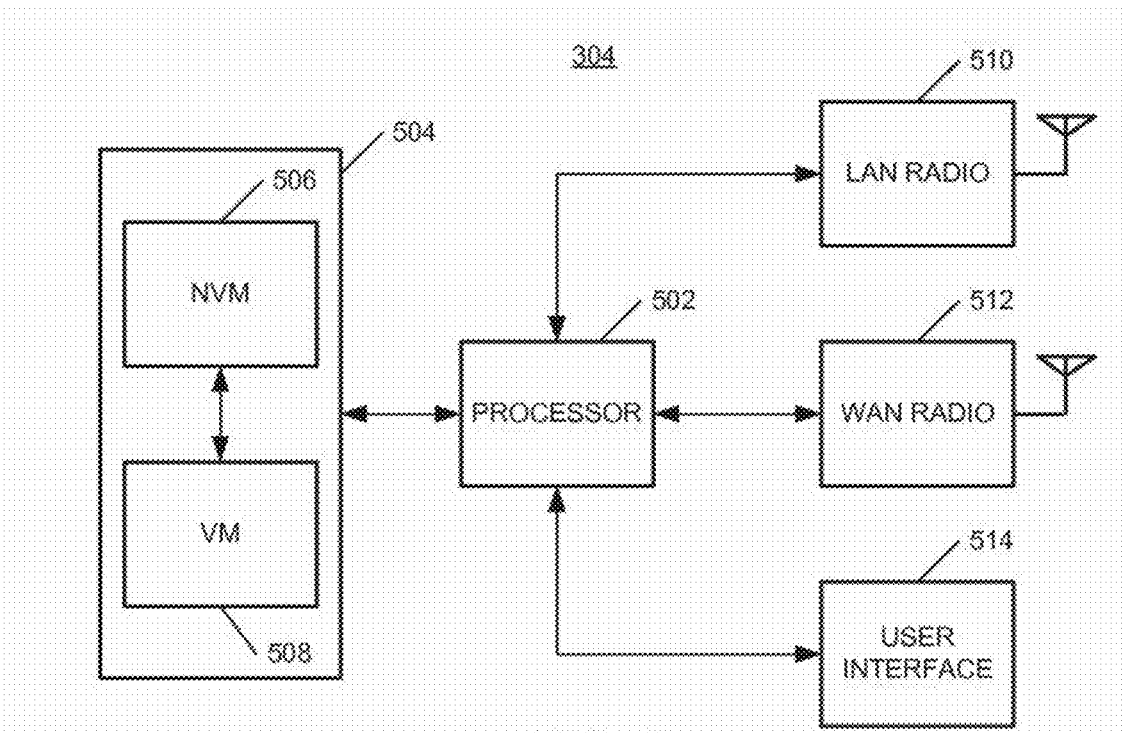
FIG. 6 is a diagram illustrating example components that can be included in a wireless router included in the system of FIG. 3 in accordance with one embodiment.

FIG. 6 is a diagram illustrating certain components that can be included in wireless router 304 in accordance with one embodiment. It will be understood that additional components can be included in wireless router 304. The example of FIG. 6 is not intended to exhaustively show all components, but rather is provided by way of example to illustrate certain components in relation to the systems and methods described herein. As such, the example of FIG. 5 should not be seen as limiting the systems and methods described herein to a certain design or architecture. Moreover, the components illustrated in FIG. 6 are obviously depicted at a high level. It will be understood that the components can actually be implemented via multiple components such as multiple integrated circuits, discrete device, or both, and can be packaged in a single package or in multiple packages. It will also be understood that wireless router 304 is often battery powered and therefore will comprise a battery (not shown).

Referring to FIG. 6, wireless router 304 can comprise a processor 502 interfaced with memory 504, LAN radio 510, WAN radio 512, and user interface 514. Processor 502 will often comprise several processing cores such as a digital signal processing core, a microprocessing core, math-coprocessors, etc.

Memory 504 can comprise several forms of memory, such as non-volatile memory 506 and volatile memory 508. Non-volatile memory is used to store data and instructions that should be maintained even when power is removed from wireless router 304. Volatile memory is used to store instructions and data for which it is not important whether it is maintain when power is removed. For example, the code used to run wireless router 304 can be stored in non-volatile memory 506 such that it is maintained even when wireless router 304 is turned off and so that wireless router 304 can access this code when it is turned on again; however, the code can be copied to volatile memory 508 when wireless router 304 is on. This can, for example, allow faster access to instructions and data by processor 502.

Examples of non-volatile memory include Read-Only Memory (ROM), flash memory, and most types of magnetic computer storage devices, e.g., hard disks, floppy disks, and magnetic tape and optical discs, although these later devices are not generally used for wireless router 304. Rather, the former, which can be referred to as electrically addressed non-volatile memories are typically used for wireless router 304. Non-volatile memory is typically used for the task of secondary storage, or long-term persistent storage. Most forms of non-volatile memory have limitations that make them unsuitable for use as primary storage. Typically, non-volatile memory either costs more or performs worse than volatile random access memory. Electrically addressed non-volatile memories can include a Programmable ROM (PROM), Erasable PROMs (EPROM), Electrically erasable PROM (EEPROM), Flash memory, or some combination thereof.

Volatile memory, also known as volatile storage or primary storage device, is computer memory that requires power to maintain the stored information, unlike non-volatile memory which does not require a maintained power supply. The most widely used form of primary storage today is a volatile form of random access memory (RAM), meaning that when the computer is shut down, anything contained in RAM is lost. Most forms of modern RAM are volatile storage, including Dynamic Random Access Memory (DRAM) and static random access memory (SRAM). Thus, wireless router 304 can include DRAM, SRAM, or some combination thereof, although wireless router 304 is more likely to include SRAM than DRAM.

In certain embodiments, some portion or even all of non-volatile memory 506, volatile memory 508, or both can be included with processor 502.

LAN radio 510 can comprises all of the hardware required for the radio front end of the wireless LAN interface. Similarly, WAN radio 512 can comprises all of the hardware required for the radio front end of the wireless WAN interface. Processor 502 or components thereof can serve as the processing backend for both radios 510 and 512. Alternatively, separate processing circuitry can be included for each of the LAN function and the WAN function. In such embodiments, the processing functionality described herein can be included in either the LAN processing circuitry or the WAN processing circuitry.

User interface 514 can comprise just button 312. But in other embodiments, it can also comprise a display, e.g., to display a password.

Instructions stored in memory 504 can be used by processor 502 to control the operation of wireless router 502 including control of radios 510 and 512. Thus, the instructions stored in memory 504 should include instructions for controlling the operation of radios 510 and 512 as well as for bridging communications between basestation 320 and devices 306 and for configuring wireless router 304. In certain embodiments, the instructions for controlling WAN radio 512, and the authentication procedures for connecting to the WAN, can be included in standard code associated with WAN radio 512. These instructions can be referred to as modem instructions. Separate instructions for controlling the remaining functions of wireless router 304 can then also be stored in memory 504, including the procedures and settings for controlling LAN radio 510. These instructions can be referred to as router instructions.

Figure 7:
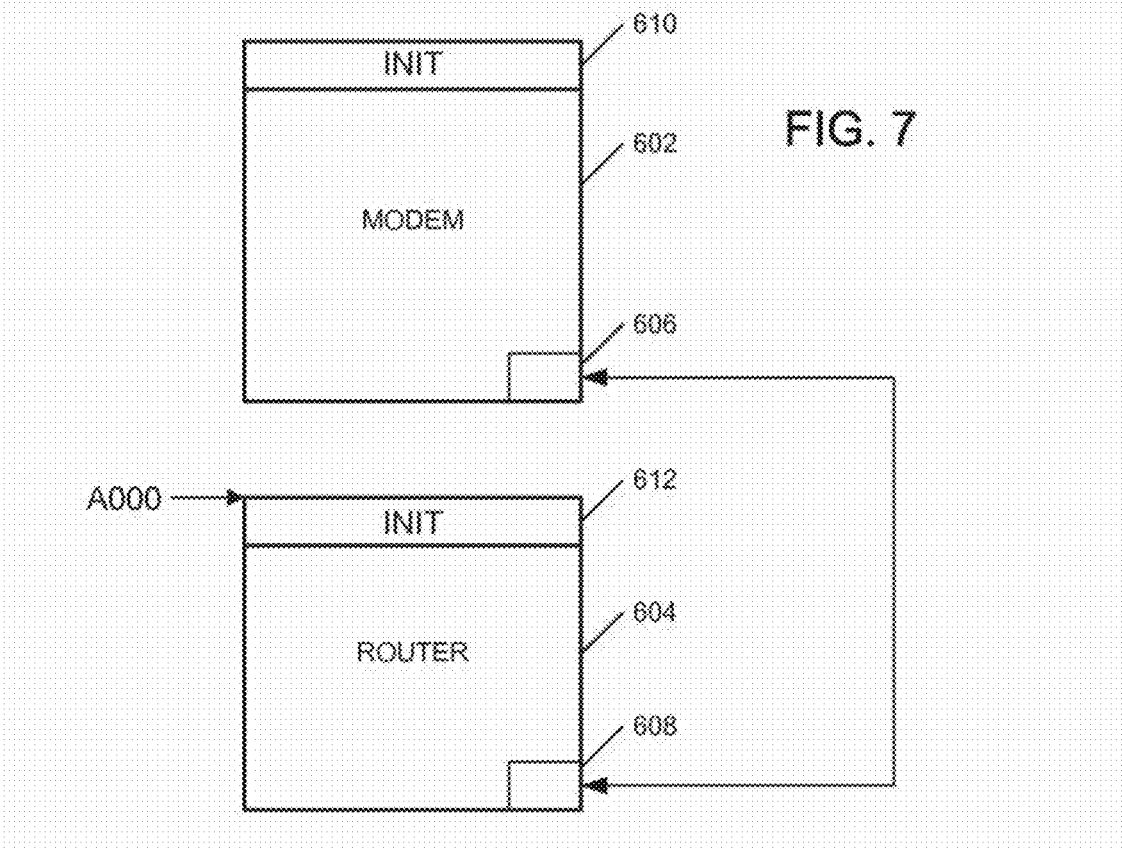
FIG. 7 is a diagram illustrating modem and router instructions that can be loaded into volatile memory in the wireless router of FIG. 6 in accordance with one embodiment.

FIG. 7 is a diagram illustrating examples blocks of instructions that can be stored in memory 504. For example, the instructions can be stored in non-volatile memory 506 and can, e.g., be copied to volatile memory 508 during operation. As can be seen, the instructions illustrated in FIG. 7 can comprise modem instructions 602 and router instructions 604. Each set of instructions can comprise an initialization routine 610 and 612 respectively, and be associated with a function table 606 and 608 respectively. Router instructions 604 can also be associated with an offset or known address, e.g., A000, at which it should be loaded into volatile memory.

Figure 8:
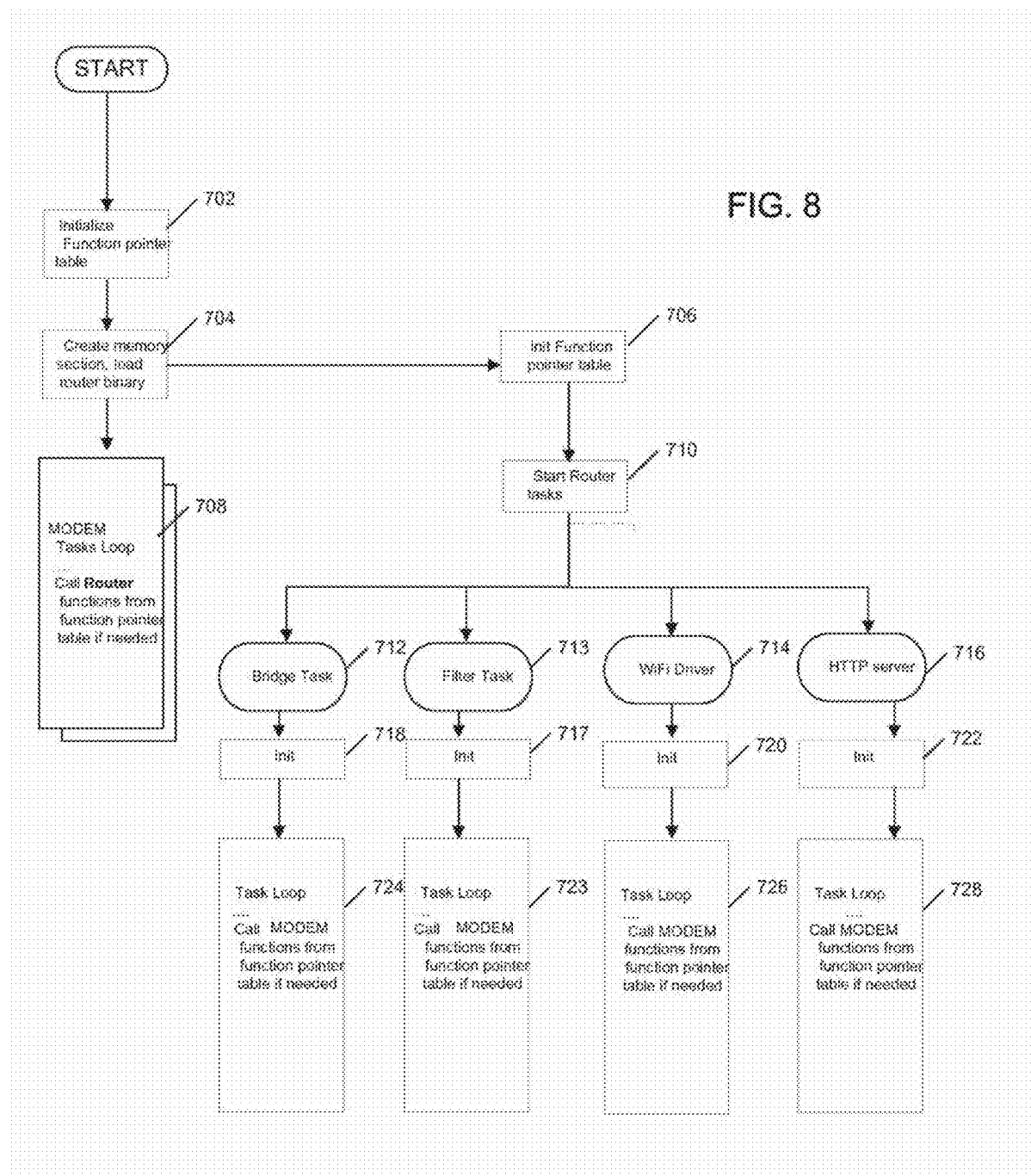
FIG. 8 is a diagram illustrating an example method for loading and initializing the modem and router instructions of FIG. 7 in accordance with one embodiment.

A process for allowing these two sets of instructions to interact must then be implemented in such embodiments. FIG. 8 is a flow chart illustrating an example process for loading modem instructions and router instructions into volatile memory 508 for execution by processor 502 and for configuring the instructions to interact with each other. In step 702, on boot up, e.g., activation of button 312, modem initialization function 610 can generate a modem function pointer table 606, which can be populated with modem functions. In step 704, a block of memory can be reserved in volatile memory 508, e.g., at the known offset address, and router instructions 604 can be loaded into the reserved block in nonvolatile memory 508. Router initialize function 612 can then be called in step 706. Initialization function 612 in the router instructions 604 can then populate function table 608 with router functions. Modem instructions 602 will need to use, or call certain functions included in router instructions 604. Similarly, router instructions 604 will need to call certain functions in modem instructions 602. Accordingly, the initialization functions can cause each set of instructions to exchange pointers to the relevant functions, such that modem function table 606 will include pointers to the relevant functions in router instructions 604 and router function table 608 will include pointers to the relevant functions in modem instructions 602.

Alternatively, a single function table with the appropriate functions and pointers can be created and used by both modem and router instructions 602 and 604; however, it will be understood that how the function tables are described is a matter of convenience and that what is important is that there is an association between functions and pointers to functions in the various instructions that is maintained within wireless router 304.

Initialization function 612 can also be configured to create a set of related tasks, e.g., an http server task, a WiFi driver task, a bridge task, etc. For example, once the functional tables are initializes, the router instructions can start to run in step 708. Different tasks can then be called in steps 712, 714, and 716, which can cause initialization functions related with each tasks to run in steps 718, 720, and 722. These initialization functions can then initialize the related tasks such that they can run in steps 724, 726 and 728.

One of these related tasks can, e.g., comprise a filter task as described above with respect to FIG. 5. For example, filter task 713 can be included in the router tasks, and filter task 713 can be initialized in step 717, and run in step 723.

On successful initialization, router instructions 604 can be configured to notify modem instructions 602 through either a return value or a signal.

Modem instructions 602 can start to run in step 708. As the modem instruction and router tasks run, they can communicate with each other using the set of function pointers populated in the function pointer tables. For example, a typical function that a router task can use is "efs_open" or "rex_sleep." Modem instructions 602 can, for example, call a transmit function in the router WiFi driver or it can call the address translate functions.

Figure 9:
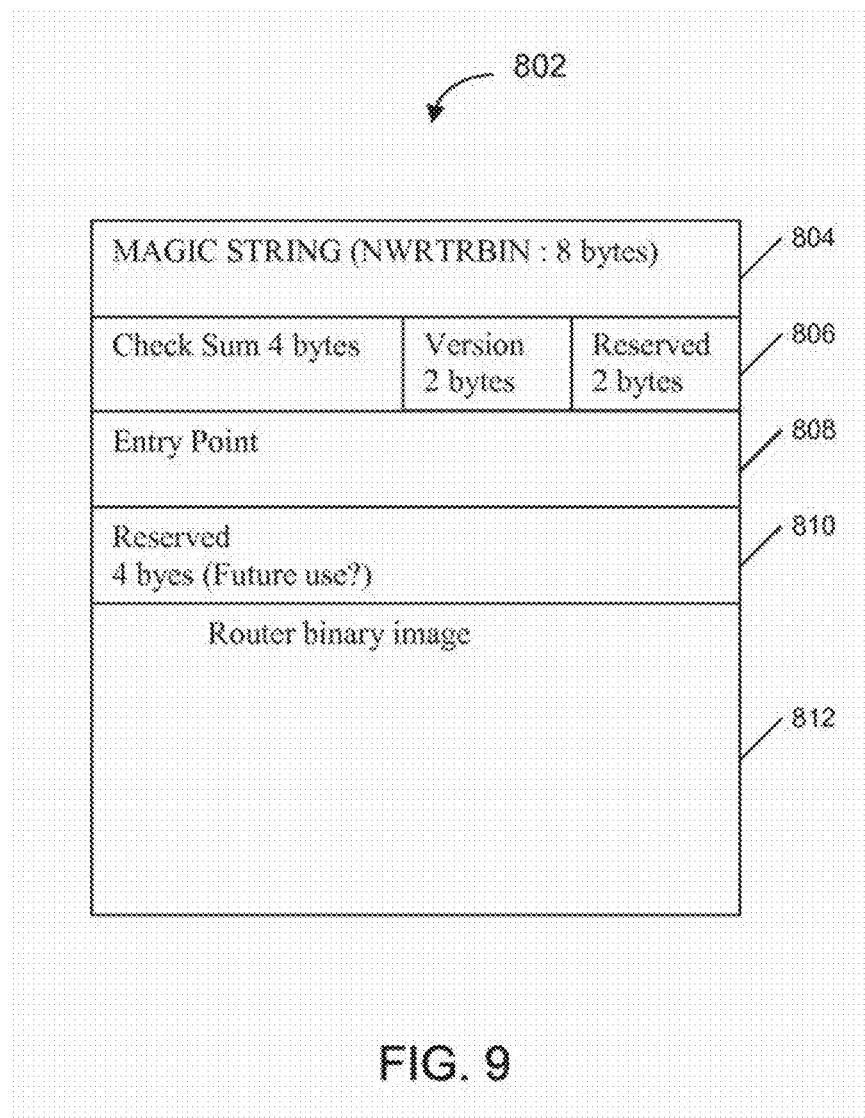
FIG. 9 is a diagram illustrating an example image of the router instructions of FIG. 6 in accordance with one embodiment.

A partition table for memory 504 can for example have one additional, e.g., 3 MB partition for router instructions 604. Router instructions 604 can be built into a binary file from, e.g., an elf file. FIG. 9 is a diagram illustrating an example image 802 of router instructions 604 in accordance with one embodiment. A header can be added to the binary and can include a signature field 804, for the image signature; a checksum field 806, which can, e.g., comprise a 4 byte checksum and a 2 byte version, as well as 2 reserved bytes; and entry point field 808 to hold the address offset; and a 4 byte reserved field 810. Image 802 can then mostly consist of the binary image 812 for instructions 604.

On boot up, the operating system can verify the checksum, version compatibility, and magic string from the image header before proceeding to the next step, e.g., step 702.

Accordingly, router instructions 604 are not statically linked into modem instructions 602. Rather, they will be compiled and linked into a separate binary with a fixed entry point (offset address) specified in the router image header. This binary can then be loaded at that exact location specified by the offset address at run time. The memory location specified by the offset address should specify a block of memory that is not used by the memory instructions. Once the memory section is created, the router binary except the header can then be loaded at the address where the image was created. After the modem instruction initialization is completed, it will call an initialization function located in the router binary. This location will be known to the modem instructions because where the router binary was loaded in the memory will be known. The router initialization function can then populate the rest of the function pointers in the structure described above for the modem instructions. Form this point on the modem and router instructions can communicate with each other using the set of functions that have been saved in the function pointer table.

Once wireless router 304 is powered up, the connection with base station 302 is establish, the LAN is activated, and wireless router 304 will be ready to route data packets from devices 306 to base station 302. Devices 306 can then access, e.g., the Internet through wireless router 304. All that may be required for devices 306 to access the Internet, or more generally the WAN associated with base station 302 is a password, which can be displayed in wireless router 304. Contrast this with system 100 in which only a single device 106 can access the WAN.

FIGS. 10A-D are diagrams illustrating various example implementations of wireless router 304. As can be seen, each implementation includes a single button 312. Additionally, as illustrated in FIG. 10D, wireless router 304 can include a USB or other data connection 902 for interfacing with wireless router 304. In certain embodiments, wireless router 304 can be approximately credit card sized. In other words, wireless router 304 can comprise a length (l) and width (w) that are very close to those of a credit card. In addition, wireless router 304 can comprise a thickness that is very thin. While it may be thicker than a credit card, the overall dimensions can be such that wireless router can easily fit in a pocket or even a wallet.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A method, comprising:
loading modem instructions and router instructions into a wireless router;
generating a modem function pointer table populated with pointers to modem functions in the modem instructions for controlling access over a wide area network;
generating a router function table populated with pointers to router functions in the router instructions for controlling access over the local area network;
wherein the modem function pointer table is also populated with pointers to relevant functions in the router instructions and the router function table is populated with pointers to relevant functions in the modem instructions; and
wherein the router function table includes a pointer to a filter task in the router instructions;
loading authentication procedures required to connect to the wide area network and settings for the local area network into the wireless router;
establishing a first data connection between the wireless router and a base station associated the wide area network over the wide area network using the loaded authentication procedures;
establishing a second data connection between the wireless router and at least one computing device over the local area network using the loaded settings for the local area network;
discovering the at least one computing device and a device type of the at least one computing device; and
determining, based on the filter task and device type of the at least one computing device, whether the at least one computing device is authorized to access the wide area network.

2. The method of claim 1, wherein the wide area network is a cellular type network.

3. The method of claim 2, wherein the cellular type network is a WiMAX, UMTS, HSPA, HSPA+, LTE, GPRS, 1xRTT or DOrA network.

4. The method of claim 1, wherein the local area network is a WiFi network.

5. The method of claim 1, wherein the local area network is a wireless USB network, an Ultrawideband network, or a Zigbee network.

6. The method of claim 1, wherein the first data connection is a Point-to-Point (PPP) connection.

7. The method of claim 1, wherein the second data connection is a TCP/IP connection.

8. The method of claim 1 further comprising, discovering at least one service and a service type of the at least one service, the at least one service being requested by or being run by the at least one computing device.

9. The method of claim 8 further comprising, determining whether the at least one service is authorized by the wide area network, based on the service type of the at least one service.

10. The method of claim 8, wherein the discovery of the at least one service and the service type of the at least one service comprises performing at least one of packet sniffing and Internet Protocol (IP) address monitoring.

11. The method of claim 10, wherein the IP address monitoring comprises monitoring an IP address associated with a network entity to which the at least one computing device is connected or to be connected to run the at least one service.

12. A method, comprising:
loading modem instructions and router instructions into a wireless router;
generating a modem function pointer table populated with pointers to modem functions in the modem instructions for controlling access over a wide area network;
generating a router function table populated with pointers to router functions in the router instructions for controlling access over the local area network;
wherein the modem function pointer table is also populated with pointers to relevant functions in the router instructions and the router function table is populated with pointers to relevant functions in the modem instructions; and
wherein the router function table includes a pointer to a filter task in the router instructions;
loading authentication procedures required to connect to the wide area network and settings for the local area network into the wireless router;
establishing a first data connection between the wireless router and a base station associated the wide area network over the wide area network using the loaded authentication procedures;
establishing a second data connection between the wireless router and at least one computing device over the local area network using the loaded settings for the local area network;
discovering a service being requested by or being run by the at least one computing device and a service type of the service; and
determining, based on the filter task and service type, whether the service is authorized by a carrier operating the wide area network.

13. The method of claim 12, wherein the wide area network is a cellular type network.

14. The method of claim 13, wherein the cellular type network is a WiMAX, UMTS, HSPA, HSPA+, LTE, GPRS, 1xRTT or DOrA network.

15. The method of claim 12, wherein the local area network is a WiFi network.

16. The method of claim 12, wherein the local area network is a wireless USB network, an Ultrawideband network, or a Zigbee network.

17. The method of claim 12, wherein the first data connection is a Point-to-Point (PPP) connection.

18. The method of claim 12, wherein the discovery of the service and the determination of the service type comprises performing at least one of packet sniffing and Internet Protocol (IP) address monitoring.

19. The method of claim 18, wherein the IP address monitoring comprises monitoring an IP address associated with a network entity to which the at least one computing device is connected or to be connected to run the service.

* * * * *